Nov. 5, 1968  M. STRUGAR, JR  3,409,714

FUEL TANK

Filed Aug. 9, 1966

INVENTOR.
MICHAEL STRUGAR JR.
BY
Joseph Januszkiewicz
ATTY.

United States Patent Office 3,409,714
Patented Nov. 5, 1968

3,409,714
FUEL TANK
Michael Strugar, Jr., Cuyahoga Falls, Ohio, assignor to
The B. F. Goodrich Company, New York, N.Y., a
corporation of New York
Filed Aug. 9, 1966, Ser. No. 571,242
6 Claims. (Cl. 264—242)

ABSTRACT OF THE DISCLOSURE

A fuel tank for a motor vehicle comprising an outer rigid closed container having an inner flexible, collapsible container that is impervious to liquid fuels with such outer container having an opening to atmosphere to facilitate collapse of the inner container upon withdrawal of liquid fuels from such inner container as well as accommodate the refilling of the inner container.

---

This invention relates to a fuel tank and more particularly to a novel fuel tank or fuel cell and the novel method of making such tank or cell.

It is the customary practice to use metallic tanks for the storage of gasoline on automobiles, which tanks are strapped or otherwise secured to the frame of an automobile. In the interest of reducing the escape of gasoline fumes from such tank and for complete containment of vapors in an automobile fuel system to reduce air contamination, as well as to increase the comfort and safety of the drivers by eliminating the exposure to gasoline fumes and fire hazards, it is contemplated by the present invention to provide an automobile fuel tank which is composed of an inner and outer container wherein the inner container is flexible (not stiff) and collapsible relative to the outer non-flexible container. The inner container is made impervious to liquid fuels and fuel vapors providing the further advantage of eliminating moisture entrapment in the tank as well as vapor blow-back when filling the tank since the vapor space is eliminated. A further application and use of such principle is in the use of such container for the underground storage of volatile fuels to eliminate pollution of air and prevent water condensation thereby assuring an uncontaminated product. A further application and use of such principle is in the use of such container for the transportation of volatile fuels (as in tank trucks) to eliminate pollution of air during filling and emptying operations and to decrease fire hazard from vapors present during such operations.

An object of this invention is to provide a new and improved fuel tank.

A further object of this invention is to provide a fuel tank which is economical to manufacture and provides a complete containment of vapors in automobile systems.

Another object of this invention is to provide a fuel tank that eliminates vapor entrapment in the fuel system.

A further object of this invention is to provide a novel fuel storage cell that eliminates the contamination of the surrounding air.

Another object of this invention is to minimize fire hazards in and around fuel storage areas particularly during transfer of volatile fluids.

These and other objects of the invention will become more apparent upon consideration of further details of the invention of the preferred embodiment thereof, when taken in conjunction with the following drawings in which.

Figure 1:
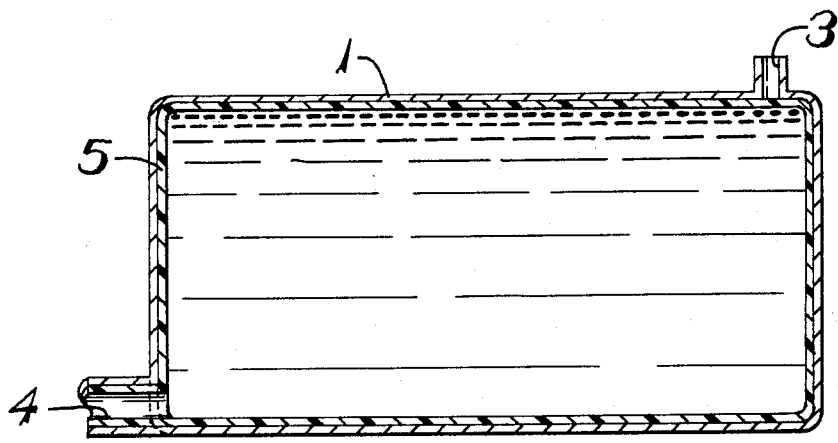
FIG. 1 is a cross-sectional elevation view of the fuel tank.
Figure 2:
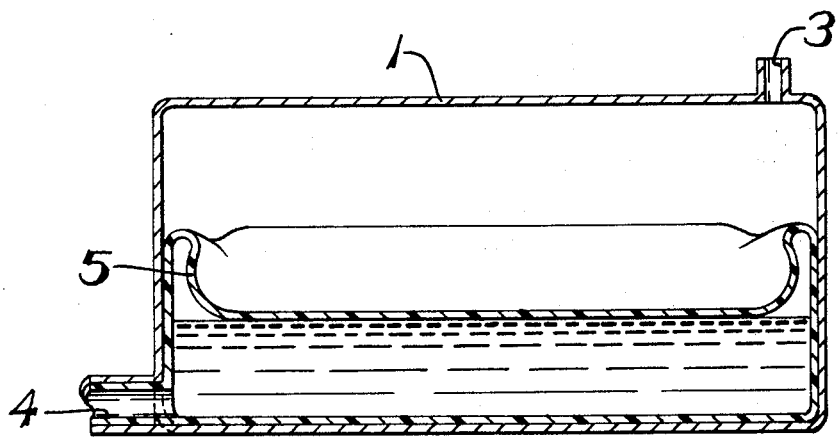
FIG. 2 is a cross-sectional elevational view of the fuel tank showing the inner container partially collapsed.

The present invention contemplates a novel fuel cell and the novel method of fabricating such fuel tank which utilizes an outer container such as a molded plastic container or metal tank 1, which tank 1 is shown as rectangular; however, other configurations are contemplated to adapt such tanks for ease of mounting onto the vehicle to be used. Tank 1 has a pair of spaced openings 3 and 4 which act as a vent to atmosphere and as a connection with the carburetor for utilization as fuel respectively. Such opening 4 may be utilized to fill the inner bag or if desired a separate opening may be provided to fill and refill the inner container. The vent opening 3 may be connected to a controlled pressure source to provide selective positive pressure on the gasoline or fuel envelope bag or inner container 5 fabricated in such outer tank 1. However, as shown, atmospheric air pressure alone is used to collapse the inner container 5. The inner container 5 is made by pouring or spraying a polyurethane, latex, cement, or other similar material into the tank and then draining the excess therefrom. In such process a small deposit is left on the inner surface of the outer container. After a suitable drying period the above step is repeated until a proper thickness is built up on the inner surface of the outer container or tank 1. A solution of suitable barrier material such as polyamide resin is then poured or sprayed through the opening 4 into the inner container forming a layer on the polyurethane layer of material. The excess of such polyamide resin material is then drained from the container and the thin layer of polyamide resin is dried. This step is repeated until the proper thickness of the barrier material is built up. Such polyamide resin or nylon layer is impervious to aromatic hydrocarbons such as gasoline. A solution of polyurethane material is then sprayed or poured into such inner container over the polyamide resin layer or nylon layer forming a thin layer of material thereon with the excess of such solution being poured off. Such polyurethane material layer is permitted to dry and, if desired, this step is repeated to provide the necessary thicknesses desired on such inner container being formed. Such materials are dried between applications of layers. During such molding process the opening 3 is covered to faciiltate the fabrication of the inner container with but a single opening coincident with opening 4, which opening is used to introduce and drain the excess liquid. During such draining process a suitable layer of material is formed to facilitate the covering of such tubular connection adjacent opening 4 to assure the retention of the inner bag in place.

In the use of such invention for the storage of large supplies of volatile fuels such as at gasoline service stations or at storage depots the principle is essentially the same except for size and handling of the container during the process because of such size. The inner container is fabricated within the outer container without the requirement of maintaining separable parts or a separate mold thereby reducing the costs of fabrication. The inner container is flexible in nature and of suitable thickness to make it durable and impervious to aromatic hydrocarbons.

The inner container 5 so formed is then cured, if necessary, providing an inner container 5 that is impervious to gasoline and flexible in nature. The opening 3 is uncovered and, if desired, additional small surface holes or openings are provided in the outer container to permit the movement of air between the inner and outer container to facilitate the filling and withdrawal of liquid from the inner container in accordance with the amount of fuel in such inner container. If desired a flexible tube may be passed through the opening 4 extending into the lower portion of the tank 1 to assure full draining of the inner container 5 as the level of the fuel recedes in the inner container 5. In addition suitable elastic tabs may be used to connect the envelope or inner container to the tank 1 to assure proper return of the bag to its original location to avoid crimping of the container 5 through repeated draining. Such tab connection additionally provides for controlled folding or collapse of the bag in the tank 1.

The choice of materials for use in building up the inner container 5 are wide and include thermoset or thermoplastic urethane material, latex, cements and other thermoplastics. Reference is made to U.S. Patent 3,129,014 as to type of material available for such use. The barrier material which is impervious to the escape of gasoline includes such materials as polyamide resins, nylon or nylon derivatives and others all commercially available on the market. Note above U.S. Patent 3,129,014. The operation of forming several layers through repeated spraying and draining of fluids into the tank 1 is similar to slush molding; however, herein the mold becomes part of the finished product.

Obviously many modifications of the present invention are possible in light of the above teachings. It is therefore to be understood that within the scope of the appended claims the invention may be practiced otherwise than as specifically described.

I claim:

1. The method of making a fuel tank which consists of providing an outer rigid hollow container and forming an inner flexible hollow container inside of said outer container with said inner hollow container being formed of a plurality of layers of rubber followed by a plurality of layers of barrier material impervious to gasoline, and curing the inner flexible container.

2. The method of making a fuel tank as set forth in claim 1 wherein said barrier material is a layer of nylon material.

3. The method of fabricating a fuel tank comprising the steps of providing an outer solid shell container, spraying a solution of thermoplastic polyurethane material into said outer container, removing the excess of said thermoplastic polyurethane material, drying such layer of thermoplastic polyurethane material, spraying a solution of thermoplastic polyurethane material onto said dried thermoplastic polyurethane material coating, drying such polyurethane material, spraying a barrier material impervious to aromatic hydrocarbons onto said layer of polyurethane coating, removing the excess of said barrier material, drying such inner layers of material, spraying additional barrier material into said inner container, removing the excess of such material, and drying such barrier material.

4. The method of fabricating a fuel tank as set forth in claim 3 wherein said polyurethane material is a thermosetting material and said inner container is cured inside of said outer container to provide a one piece fuel tank.

5. The method of fabricating a tank with an outer and inner container for use in the storage of volatile fuels comprising the steps of providing an outer container with an opening therein, molding an inner flexible container into said outer container through said opening while attaching said inner container to said outer container adjacent to the opening thereby making an integral unit, and providing passages through said outer container to facilitate the movement of air between said containers upon withdrawal and filling of said inner container.

6. The method of fabricating a tank as set forth in claim 5 wherein said inner container has a layer of polyamide resin molded therein which makes such inner container impervious to the escape of gasoline vapors therefrom.

References Cited

UNITED STATES PATENTS

| | | | |
|---|---|---|---|
| 1,873,817 | 8/1932 | Buddenhagen | 222—95 X |
| 2,161,281 | 6/1939 | Carter | 264—255 X |
| 2,519,393 | 8/1950 | Noyes | 244—135 |
| 2,802,763 | 8/1957 | Freedlander. | |
| 2,815,887 | 12/1957 | Ford et al. | 222—105 |
| 2,973,293 | 2/1961 | Schofield. | |
| 2,974,373 | 3/1961 | Streed et al. | 264—255 X |
| 3,129,014 | 4/1964 | Hutchison et al. | 280—5 |
| 3,136,507 | 6/1964 | Erlanger et al. | 244—135 |
| 3,204,825 | 9/1965 | Underwood | 222—105 |
| 3,222,099 | 12/1965 | Swallert | 280—5 X |
| 3,255,932 | 6/1966 | Hunter et al. | 222—105 X |
| 3,274,323 | 9/1966 | Petriello | 264—308 |

SAMUEL F. COLEMAN, *Primary Examiner.*